May 4, 1937.                J. M. MARTY                2,079,460
                           SHAFT COUPLING
                         Filed May 22, 1936
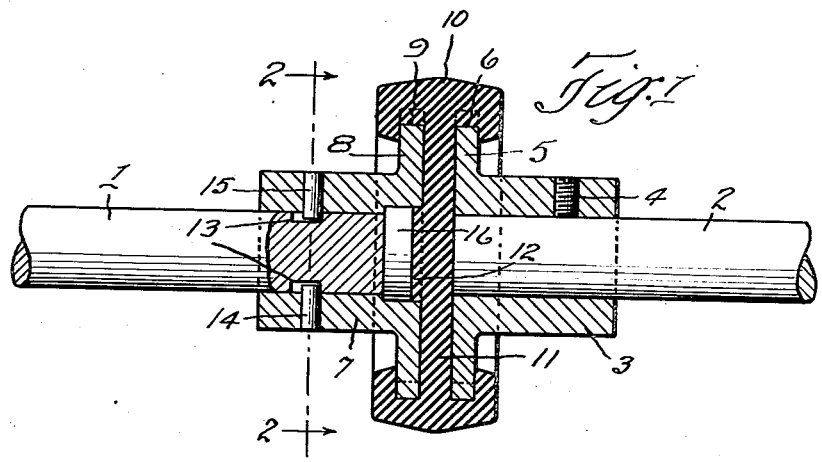
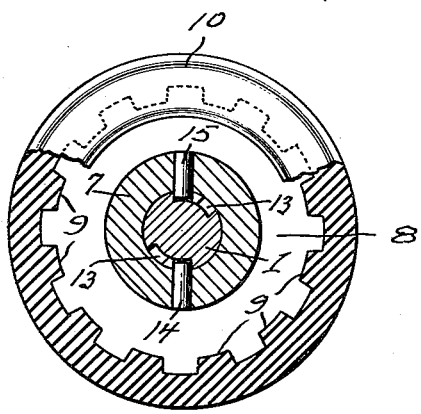
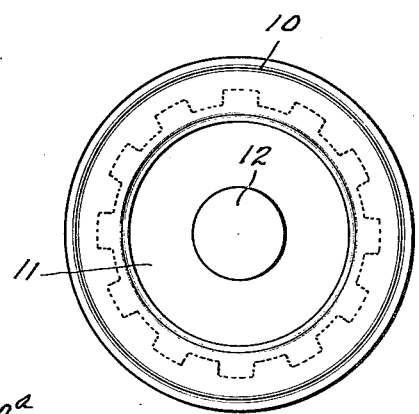
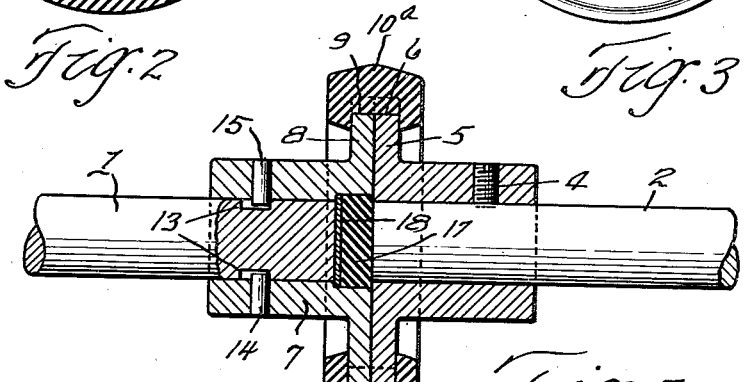
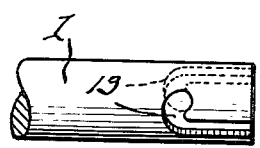
INVENTOR.
John M. Marty
BY
Hull, Brock & West
ATTORNEY.

Patented May 4, 1937

2,079,460

UNITED STATES PATENT OFFICE 2,079,460

SHAFT COUPLING

John M. Marty, Cleveland, Ohio

Application May 22, 1936, Serial No. 81,246

5 Claims. (Cl. 64—11)

This invention relates generally to a shaft coupling which is designed to form a detachable resilient driving connection between a pair of shafts or shaft sections which are to be operated at a high speed.

One of the objects of the invention is to provide a shaft coupling which will form a resilient detachable driving connection between two shafts.

Another object of the invention is to provide a shaft coupling which will provide a flexible driving connection between two shafts and which is provided with means whereby one of the shafts may be resiliently and detachably secured in place.

Another object of the invention is to provide a shaft coupling for forming a resilient, flexible, readily detachable driving connection between two shafts and which will also serve as a universal joint and form a suitable driving connection even though the shafts may be slightly out of alignment.

A still further object of the invention is to provide a shaft coupling for forming a resilient detachable driving connection between a pair of shafts and which makes use of a connector formed of rubber or the like which will tend to take up lost motion in the coupling or in the shaft bearings and prevent excessive wear or rattling when the shafts are operated at high speed.

Another object of the invention is to provide a shaft coupling of the character described which comprises comparatively few parts all of which are well adapted for quantity production at a very low cost.

Further and more limited objects of the invention will appear as the description proceeds and by reference to the accompanying drawing in which Fig. 1 is a fragmentary vertical sectional view showing my improved coupling applied to a pair of shafts; Fig. 2 is a vertical sectional view on the line 2—2 of Fig. 1; Fig. 3 is a view in end elevation of a flexible coupling device or sleeve; Fig. 4 is a fragmentary view in side elevation showing the bayonet grooves in the end of the detachable shaft; Fig. 5 is a view similar to Fig. 1 showing a slightly modified form of my invention.

Referring now to the drawing, reference characters 1 and 2 designate a pair of shafts between which it is desired to form a detachable flexible driving connection. Secured to the shaft 2 is a hub-like member 3 which is held in place by means of a pin or set screw 4 and which has a radially disposed portion 5 the periphery of which is provided with a plurality of outwardly tapered notches 6. Fitting over the shaft section 1 is a hub 7 having radially disposed portions 8, the periphery of which is provided with a plurality of outwardly tapered notches 9. Fitting over the hubs 4 and 7 is an annular shroud or sleeve-like member 10 which is preferably formed of rubber and which has a plurality of complementary notches therein adapted to receive the notched peripheral portions of the hubs.

The member 10 is provided with a central web portion 11 which is also preferably formed of rubber or the like and which has at one side thereof a circular boss 12 adapted to project into a recess provided in the hub 7. The end of the shaft section 1 is provided with a pair of oppositely disposed bayonet slots or grooves 13 shown most clearly in Fig. 4.

Carried by the hub 7 are a pair of oppositely disposed pins 14 and 15 which are secured thereto in any suitable manner, the ends of which are adapted to engage in the bayonet grooves 13 to form a resilient detachable driving connection between the shaft 1 and the hub 7. The recess in the hub 7 is slightly larger in diameter than the shaft 1 and disposed between the end of the shaft 1 and the boss 12 is a metal thrust plate or disk 16 which serves to reduce the wear on the boss 12. When the shaft 1 is secured to the hub 7, the pins 12 and 15 engage in the bayonet slots 13 and tend to move the shaft section 1 toward the right as seen in Fig. 1 and to place the resilient boss 12 under slight compression.

When it is desired to detach the shaft section 1, it is grasped in the hand and moved inwardly slightly against the tension of the boss 12 and then turned a fraction of a turn so that pins may be disengaged from the bayonet slots. When the coupling is secured in place, the adjacent end of the shaft 2 bears against the opposite side of the web 11 so that the shafts are placed under slight tension which serves to take up any lost motion and to prevent rattling of the parts. My improved coupling is particularly designed for use in forming a flexible, detachable driving connection between shafts of small diameters and is especially useful in such devices as small boring, grinding or cutting tools, speed reducers and the like where it is desired to eliminate noise and vibration, which are driven at a high rate of speed of say 2000 to 5000 revolutions per minute or more. In view of the fact that the notches in the peripheral portions of the hubs are tapered outwardly slightly, and fit into correspondingly shaped notches in the shroud or sleeve, at high speed, the centrifugal force tends to move the sleeve outwardly radially and to release the strain due to slight misalignment of the shafts.

In Fig. 5 I have disclosed a slightly modified form of my invention and in which I substitute for the rubber sleeve or shroud 10 a slightly different form of connector 10ª which differs from the sleeve 10 in that the web portion 11 is omitted. In order to provide a resilient, detachable connection for the shaft section 1, I make use of a rubber disk or slug 17 which fits in the recess provided in the hub 7 and which is of considerable thickness. Disposed between the disk 17 and the end of the shaft section 1 is a metal thrust plate 18 which serves to reduce wear between the end of the shaft and the rubber disk 17. The rubber disk 17 performs the same function as the boss 12 in the form of my invention shown in Fig. 1 and serves to provide a resilient detachable driving connection between the shaft section 1 and the hub 7.

It will now be clear that I have provided a shaft coupling which is well adapted for forming a flexible, resilient detachable driving connection between a pair of shafts and which will accomplish the objects of the invention as hereinbefore stated. It is of course understood that the embodiment of the invention herein disclosed is merely illustrative and is not to be considered in a limiting sense as various changes may be made without departing from the spirit of my invention. For example, the web portion of the rubber sleeve may be formed in a separate piece if desired or the disk 17 may be flanged or made sufficiently large to hold the faces of the hubs in spaced relation. The invention is therefore limited only in accordance with the scope of the appended claims.

Having thus described my invention, what I claim is:

1. A shaft coupling for forming a detachable, resilient driving connection between a pair of shafts comprising a pair of hubs connected with said shafts respectively, each hub having a notched peripheral portion, a rubber sleeve surrounding the notched portions of said hubs and forming a driving connection therebetween, said sleeve having an integrally formed web portion thereon having a boss projecting into one of said hubs and means cooperating with said web portion and boss for resiliently and detachably securing the adjacent shaft with respect thereto.

2. In a shaft coupling, the combination of a pair of shafts, a hub carried by each of said shafts, each hub having a notched peripheral portion, a rubber sleeve surrounding the notched portions of each of said hubs and forming a resilient driving connection therebetween, said sleeve having an integrally formed web portion disposed between the adjacent ends of said shafts, said web portion having a rubber boss thereon which projects into one of said hubs, the adjacent shaft abutting said boss, and means detachably securing said adjacent shaft to said hub in such a manner that said boss is placed under compression by said shaft.

3. A shaft coupling for forming a resilient, detachable driving connection between a pair of shafts, comprising a hub adapted to be detachably secured to the end of one shaft and to be operatively connected with the other shaft, means forming a driving connection between said shafts comprising a rubber sleeve surrounding the adjacent end portions of said shafts and having an integrally formed web portion extending between the adjacent ends of said shafts, means detachably securing said hub to the adjacent shaft comprising a pair of bayonet slots on said shaft and cooperating projecting portions on the adjacent hub, the adjacent ends of said shafts abutting said web portion and being urged apart thereby whereby to provide a resilient readily detachable driving connection.

4. A shaft coupling for forming a driving connection between a pair of shafts comprising a pair of hubs secured to said shafts respectively, each hub having a notched peripheral portion, a rubber sleeve surrounding the notched portions of said hubs and forming a detachable driving connection therebetween, said sleeve having an integrally formed web portion disposed between the adjacent ends of said shafts and engaged thereby, and cooperating means on one of said hubs and the adjacent shaft for resiliently and detachably securing such shaft in place and for urging it against said web portion.

5. A shaft coupling for forming a driving connection between a pair of shafts comprising a pair of hubs secured to said shafts respectively, each hub having a notched peripheral portion, a rubber sleeve surrounding the notched portions of said hubs and forming a detachable driving connection therebetween, said sleeve having an integrally formed web portion disposed between the adjacent ends of said shafts and engaged thereby, and cooperating means on one of said hubs and the adjacent shaft for resiliently and detachably securing such shaft in place and for urging it against said web portion, and means disposed between said last mentioned shaft and web portion for reducing wear.

JOHN M. MARTY.